(12) United States Patent
Ruiz

(10) Patent No.: US 7,600,949 B2
(45) Date of Patent: Oct. 13, 2009

(54) LANDSCAPE ROLL LAYER

(76) Inventor: Juan M. Ruiz, 9516 Beech Ave., Crystal Lake, IL (US) 60014

( * ) Notice: Subject to any disclaimer, the term of this patent is extended or adjusted under 35 U.S.C. 154(b) by 318 days.

(21) Appl. No.: 11/673,664

(22) Filed: Feb. 12, 2007

(65) Prior Publication Data
US 2008/0193228 A1    Aug. 14, 2008

(51) Int. Cl.
*E02D 17/20* (2006.01)
(52) U.S. Cl. .................. 405/302.7; 405/302.6; 405/15
(58) Field of Classification Search ........... 405/302.7, 405/302.6, 302.4, 258.1, 15, 16, 17, 19
See application file for complete search history.

(56) References Cited

U.S. PATENT DOCUMENTS

| | | | |
|---|---|---|---|
| 3,845,584 A | 11/1974 | Merees | |
| 3,958,772 A | 5/1976 | Hynson | |
| 4,008,862 A | 2/1977 | Wilmes | |
| 4,044,967 A | 8/1977 | Guichon | |
| 4,049,140 A | 9/1977 | Roose | |
| 4,082,192 A | 4/1978 | Cox | |
| 4,113,116 A | 9/1978 | Brandt | |
| 4,354,556 A | 10/1982 | Evans | |
| 4,514,127 A | 4/1985 | Maier | |
| 4,716,679 A | 1/1988 | Heard | |
| 4,909,667 A * | 3/1990 | DeMello | 405/129.9 |
| 5,074,734 A | 12/1991 | Price et al. | |
| 5,215,278 A | 6/1993 | Hess | |
| 5,253,970 A | 10/1993 | Bashaw, III | |
| 5,304,014 A * | 4/1994 | Slutz | 405/129.9 |
| 5,307,880 A | 5/1994 | Woerner | |
| 5,437,528 A | 8/1995 | Decker | |
| 5,525,012 A * | 6/1996 | Casimaty et al. | 405/302.7 |
| 5,620,281 A * | 4/1997 | Lammers et al. | 405/129.9 |
| 5,697,452 A | 12/1997 | Link | |
| 5,988,289 A | 11/1999 | Holland et al. | |
| 6,264,400 B1 * | 7/2001 | Gent | 405/129.75 |
| 6,550,406 B2 | 4/2003 | Bass et al. | |
| 6,558,079 B1 * | 5/2003 | Kozak et al. | 405/129.9 |
| 6,786,446 B1 * | 9/2004 | Kaul et al. | 405/129.75 |
| 7,188,447 B2 * | 3/2007 | Rose et al. | 47/32.2 |
| 7,351,016 B1 * | 4/2008 | Nordloh | 405/302.6 |
| 2003/0136565 A1 | 7/2003 | Peterson | |
| 2004/0161300 A1 * | 8/2004 | Kaul et al. | 405/129.95 |

FOREIGN PATENT DOCUMENTS

EP      0726023 A1    8/1996
WO    PCT/US92/08771    10/1992

* cited by examiner

*Primary Examiner*—Frederick L Lagman
(74) *Attorney, Agent, or Firm*—Mathew R. P. Perrone, Jr.; Brie A. Crawford

(57) ABSTRACT

A landscape roll layer attaches to a three-point hitch on a tractor. The landscape roll layer cooperates with a tractor in order to apply at least one roll of a mat to a desired area. Such rolls can protect an area to be landscaped for erosion control or may cover an area that has been seeded.

11 Claims, 21 Drawing Sheets

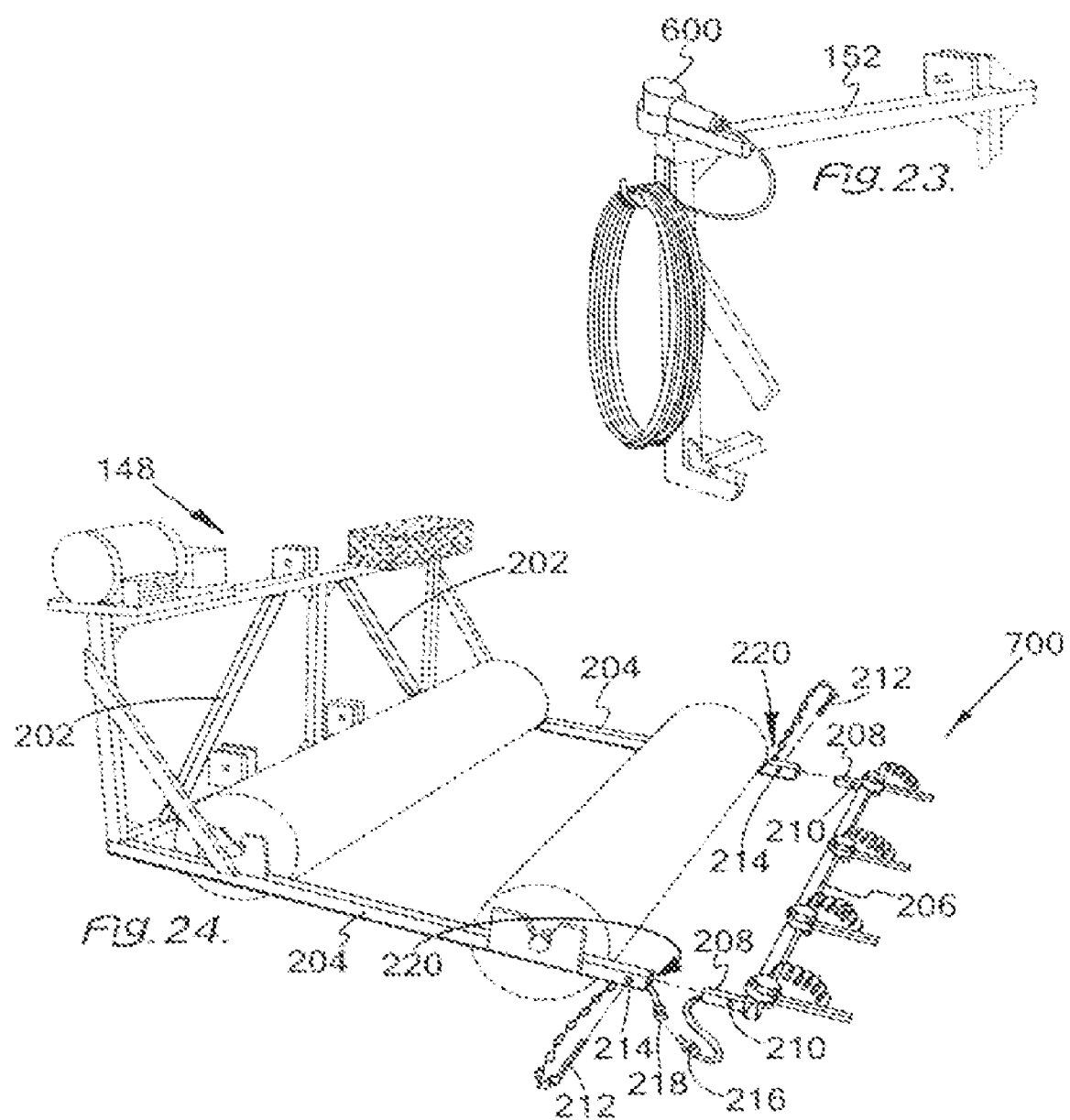

LANDSCAPE ROLL LAYER

This invention relates to a roll layer and more particularly to a roll layer for use in the landscaping industry for the application of straw or fiber matting (commonly referred to as blankets) shaped as sheets for ground cover; which are stored in large, bulky rolls; so that these large rolls may be spread on a land surface, much more efficiently in a shorter time with fewer workers.

BACKGROUND OF THE INVENTION

In the landscaping industry, straw or fiber matting which are of a standard size and shaped as sheets are purchased and stored in large, bulky rolls. These rolls are sometimes referred to as landscape rolls hereafter. These large rolls are a convenient and efficient storage means. However, the size of the landscape rolls makes them bulky and cumbersome. Such size hinders the application process. In fact, the installation of each of these landscape rolls can require both many man hours and the effort of many workers.

Such large rolls may be used for erosion control on a yet to be landscaped area; or to protect a prepared area, in order to keep grass seed or other plants in a desired position, while a root system is developed. In this manner rain or other features cannot move the items from the desired position.

A tool that makes the application process quicker and more efficient is clearly a useful invention. Such a tool must be easy to load with a landscape roll and easy to move, so that the landscape roll may be dispensed from the tool into a desired position.

SUMMARY OF THE INVENTION

Among the many objectives of the present invention is the provision of a landscape roll layer which can quickly and efficiently apply landscape rolls to an area.

Another objective of the present invention is the provision of a landscape roll layer which can store one or more landscape rolls while applying another to an area.

Also, an objective of the present invention is the provision of a landscape roll layer which can attach to a three-point hitch of a tractor.

Moreover, an objective of the present invention is the provision of a landscape roll layer which will require the labor of one person to apply the landscape rolls.

These and other objectives of the invention (which other objectives become clear by consideration of the specification, claims and drawings as a whole) are met by providing a landscape roll layer which attaches to a three-point hitch on a tractor.

BRIEF DESCRIPTION OF DRAWINGS

FIG. 23 depicts a staple gun with an air hose and holder 600 suitable for use with FIG. 1, FIG. 7 or FIG. 13.

FIG. 24 depicts a perspective view of a dual-roll landscape layer 200 of this invention, based on a reverse view of FIG. 7, with the addition of multiple staple gun bank with coiled air hoses and staple gun in cradle 700.

Throughout the figures of the drawings, where the same part appears in more than one figure of the drawings, the same number is applied thereto.

DESCRIPTION OF THE PREFERRED EMBODIMENTS

Figure 1:
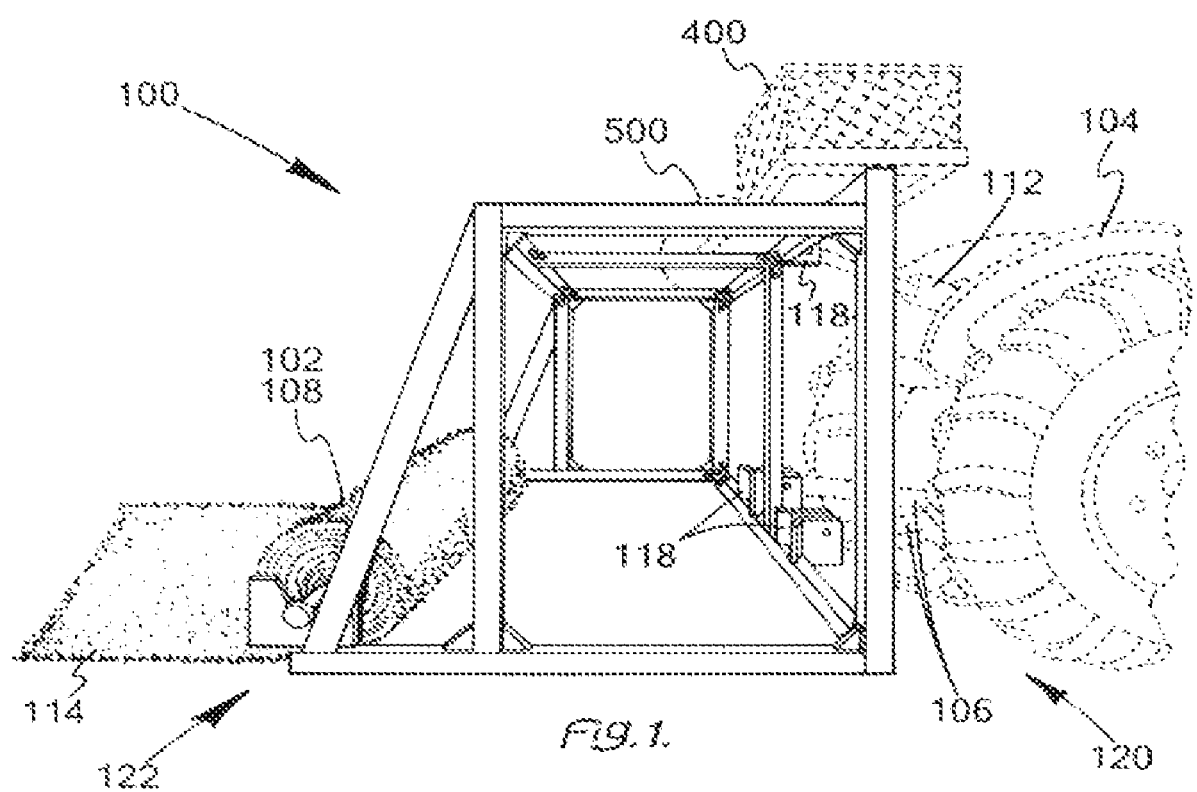
FIG. 1 depicts a perspective view of a single landscape roll layer 100 of this invention in use.
Figure 2:
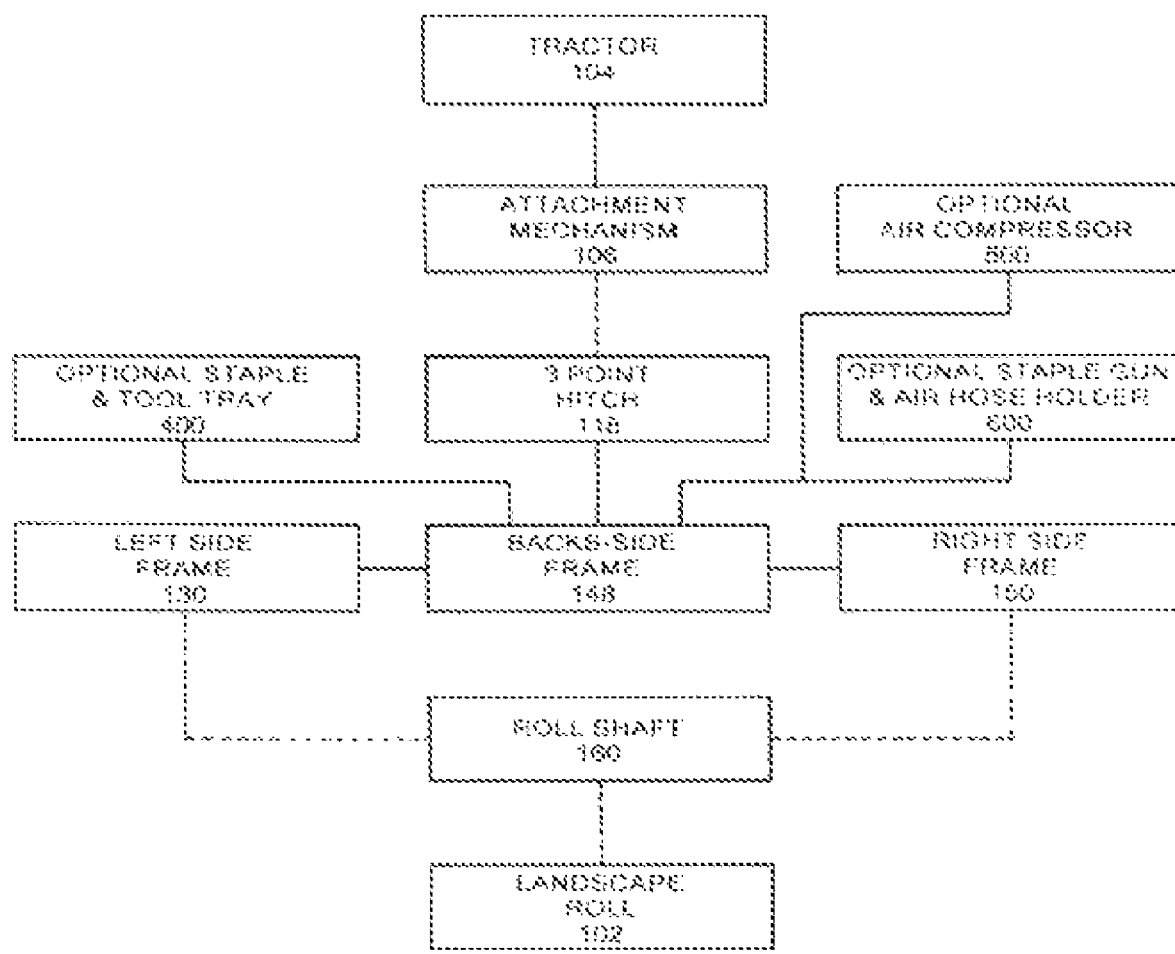
FIG. 2 depicts a block diagram of single landscape roll layer 100, based on FIG. 1.
Figure 3:
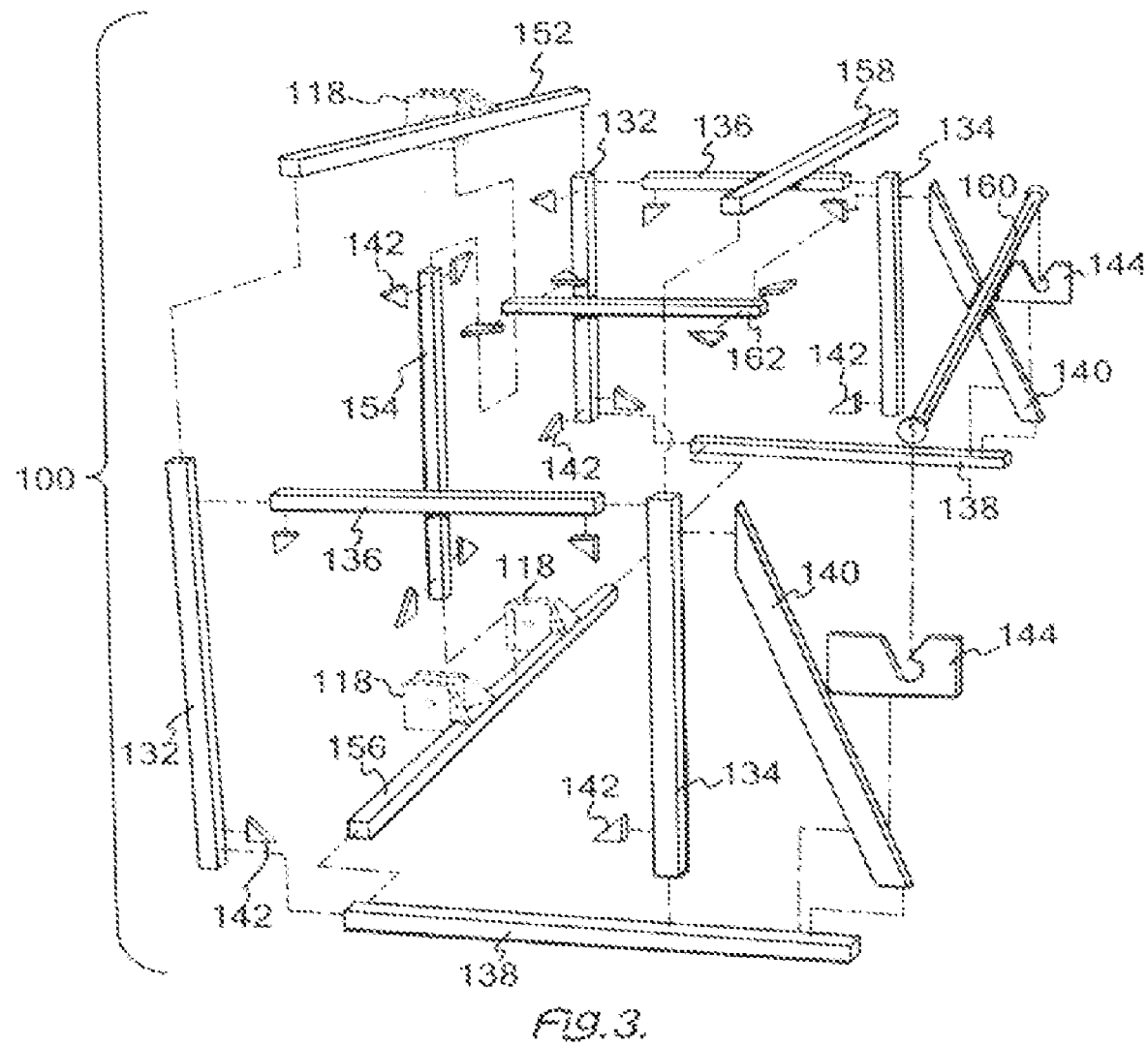
FIG. 3 depicts an exploded perspective view of single landscape roll layer 100.
Figure 4:
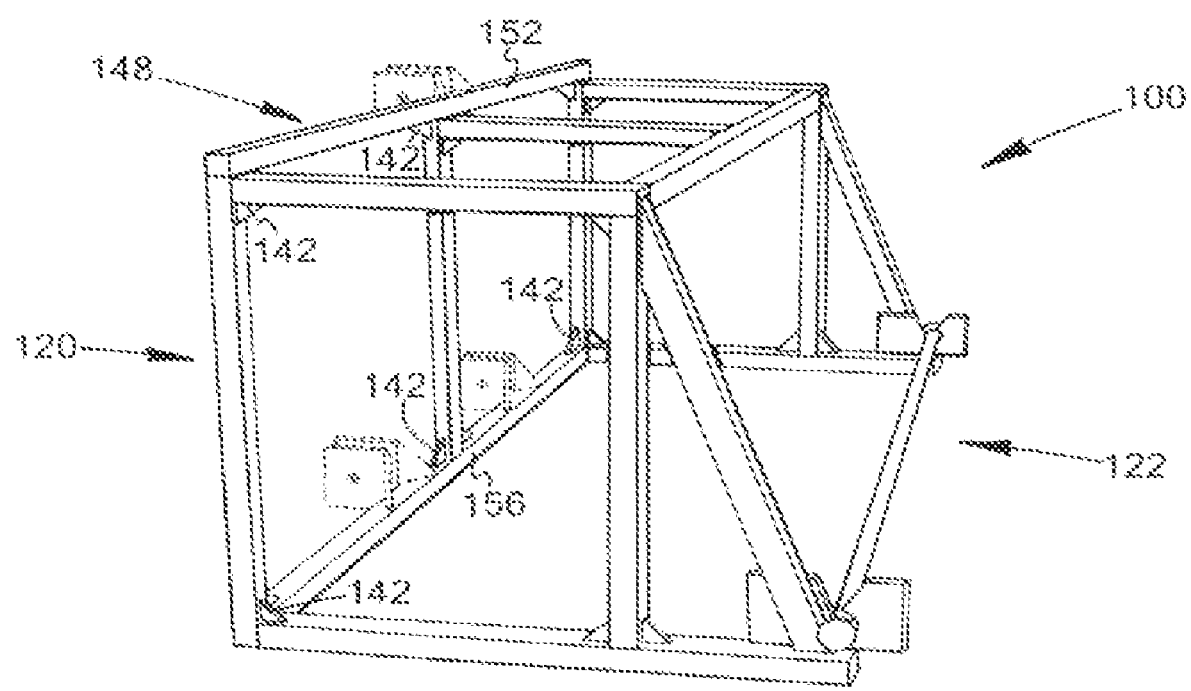
FIG. 4 depicts a perspective view of a single landscape roll layer 100 of this invention, based on a reverse view of FIG. 1.
Figure 5:
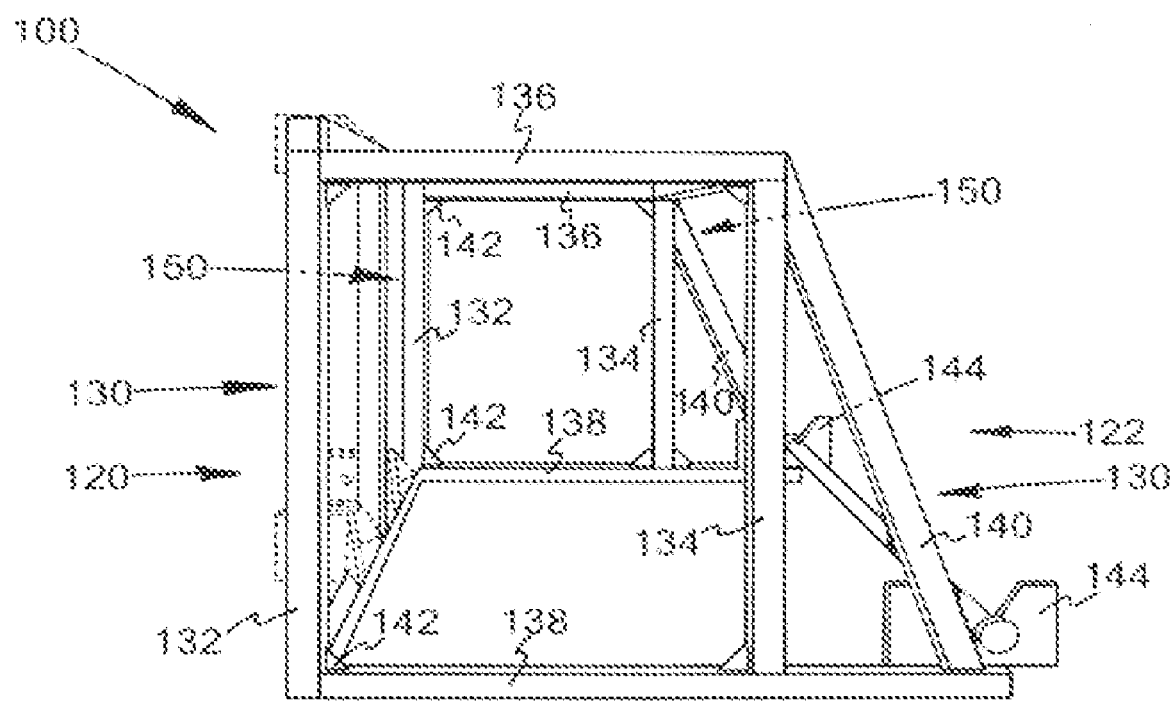
FIG. 5 depicts a side view of single landscape roll layer 100.
Figure 6:
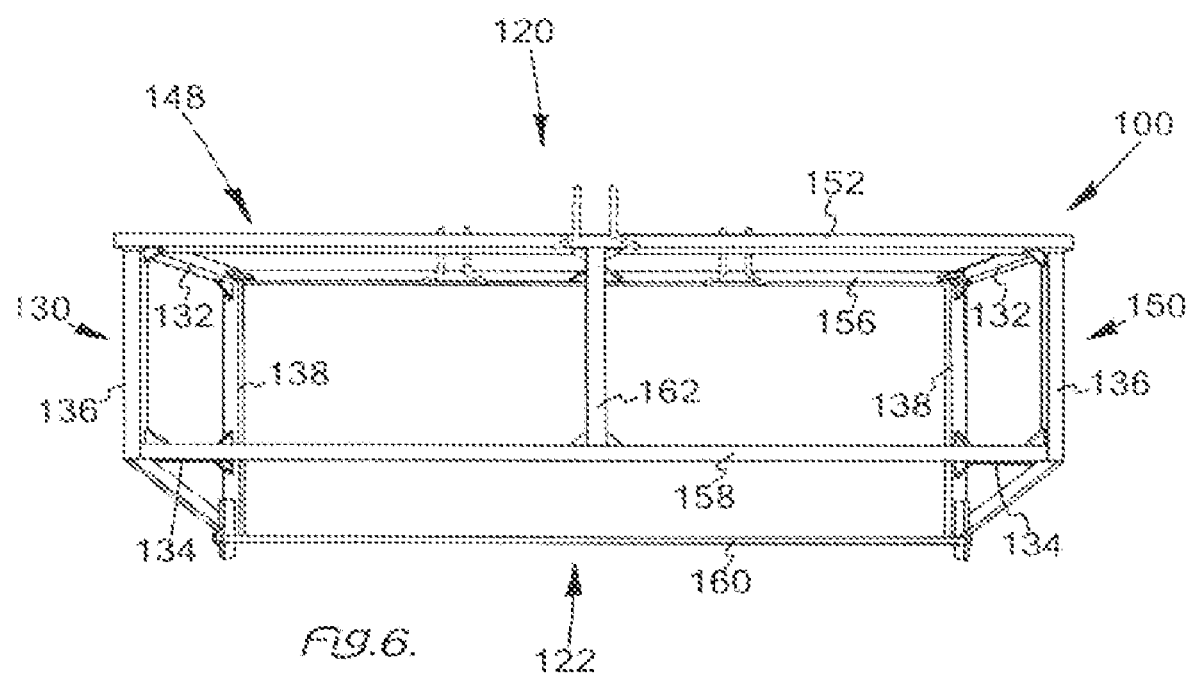
FIG. 6 depicts a top plan view of single landscape roll layer 100.

The landscape roll layer of this invention cooperates with a tractor in order to apply at least one roll of a mat to a desired area. Such rolls can protect an area to be landscaped for erosion control or may cover an area that has been seeded. The landscape roll layer has an upper frame, a side frame, a lower frame, and brackets and rods for holding the landscape rolls. The landscape roll layer attaches to a suitable attachment mechanism such as a standard three point hitch of a tractor.

This tool is the landscape roll layer of the present invention. This landscape roll layer consists of an upper frame, side frame, and lower frame with brackets and rods to hold the landscape rolls. This landscape roll layer can be attached to the three point hitch of a tractor or other hitch. Various channels, arms, and braces form the frames, which in turn form the landscape roll layer.

There are at least three embodiments of the landscape roll layer of this invention. In the first embodiment, landscape roll layer carries one landscape roll which is applied. In the second embodiment, landscape roll layer carries two landscape rolls so that one roll is applied while the other is being stored. In a third embodiment a plurality of rolls may be carried Referring now to FIG. 1, FIG. 2, FIG. 3, FIG. 4, FIG. 5 and FIG. 6, a single landscape roll 102 is carried on single landscape roll layer 100. Single landscape roll layer 100 attaches to tractor 104 through a standard attachment mechanism 106 such as standard three-point hitch 118. A height adjustment cylinder 112 moves the single landscape roll 102 along with the single landscape roll layer 100 to a desired position.

Single landscape roll layer 100 has a tractor side 120 which is joinable to tractor 104. Oppositely disposed from tractor side 120 on single landscape roll layer 100, is material delivery side 122. There is a left side frame 130 connected by a back-side frame 148 to a right side frame 150. Backsideframe 148 is adjacent to tractor 104 when the single landscape roll layer 100 is in use.

Left side frame 130 is formed as substantially a rectangle when back standing channel 132 is connected to front standing channel 134 by top cross channel 136 and bottom leg channel 138. Bottom leg channel 138 extends beyond front standing channel 134, which creates a right extension and a left extension; and a parallelogram, preferably a rectangle, is thus formed. At material delivery side 122, the end of bottom leg channel 138 is joined to front standing channel 134 by standing angle brace 140. A plurality of triangular corner strengthening braces 142 strengthen the rectangle. Standing angle brace 140 and bottom leg channel 138 have secured to them, by welding or other suitable fashion, a roll bracket 144.

Right side frame 150 is similar in structure to left side frame 130. Right side frame 150 is connected to left side frame 130, assuming a position adjacent to tractor 104 and a person facing the rear of tractor 104, at the top thereof with top joining cross channel 152 connecting to the back standing channel 132 of each frame. Center standing channel 154 is positioned between right side frame 150 and left side frame 130. Bottom joining cross channel 156 is adjacent to tractor 104 and connects the base of right side frame 150 and left side frame 130. Center standing channel 154 connects between top joining cross channel 152 and bottom joining cross channel 156.

Oppositely disposed from top joining cross channel 152, and a top of the left side frame 130 and right side frame 150, a front joining cross channel 158 further supports single landscape roll layer 100. Top linear support channel 162 is positioned between the pair of top cross channels 136. Top linear support channel 162 connects top joining cross channel 152 to front joining cross channel 158 to add extra strength and stability. The upper frame is formed by or has top joining cross channel 152, top cross channel 136, top linear support channel 162, and front joining cross channel 158.

Parts of standard three-point hitch 118 are secured to bottom joining cross channel 156 on opposing sides of center standing channel 154. With the triangulation caused by standing angle brace 140 and corner strengthening braces 142, single landscape roll layer 100 becomes very strong and durable.

At material delivery side 122 is roll bracket 144. Landscape roll shaft 160 which carries landscape roll 102 is positioned in roll bracket 144. As seen in FIG. 1, positioned landscape material 114 is unrolled and positioned upon the area to be covered in the form of a sheet on the ground or a dispensed roll. As tractor 104 moves, engaged landscape roll 108 continues unwinding.

A few optional accessories that can be applied to single landscape roll layer 100 include optional staple and tool tray 400, optional air compressor 500, and optional staple gun and air hose and holder 600. These accessories can be attached to top joining cross channel 152 through any suitable attachment mechanism.

Adding FIG. 7, FIG. 8, FIG. 9, FIG. 10, FIG. 11 and FIG. 12 to the consideration, two of landscape roll 102 are carried on dual-roll landscape layer 200. Dual-roll landscape layer 200 attaches to tractor 104, at tractor side 120, through a standard attachment mechanism 106 such as standard three-point hitch 118.

Dual-roll landscape layer 200 has a back side frame 148 which connects dual-roll left side frame 230 with dual-roll right side frame 250. Dual-roll left side frame 230 has a dual-roll bottom leg channel 238 extending therefrom. Dual-roll left side frame 230 is formed in standard fashion by back standing channel 132 and standing angle brace 140. Standing angle brace 140 connects back standing channel 132 to dual-roll bottom leg channel 238, which forms a triangle. Back standing channel 132 is on tractor side 120. Dual-roll bottom leg channel 238 is substantially longer than single roll bottom leg channel 138 and has a right extension on right side frame and a left extension on left side frame extending beyond the triangle. This extra length permits dual-roll bottom leg channel 238 to support two roll brackets 144, which cooperate to form the two roll mounts.

Dual-roll right side frame 250 is similar in structure to dual-roll left side frame 230. Dual-roll right side frame 250 is connected to dual-roll left side frame 230 by back standing channel 132 cooperating with top joining cross channel 152 and bottom joining cross channel 156. With center standing channel 154 positioned between top joining cross channel 152 and bottom joining cross channel 156, two rectangles are formed and supported by corner strengthening braces 142. The upper frame includes top joining cross channel 152.

Figure 7:
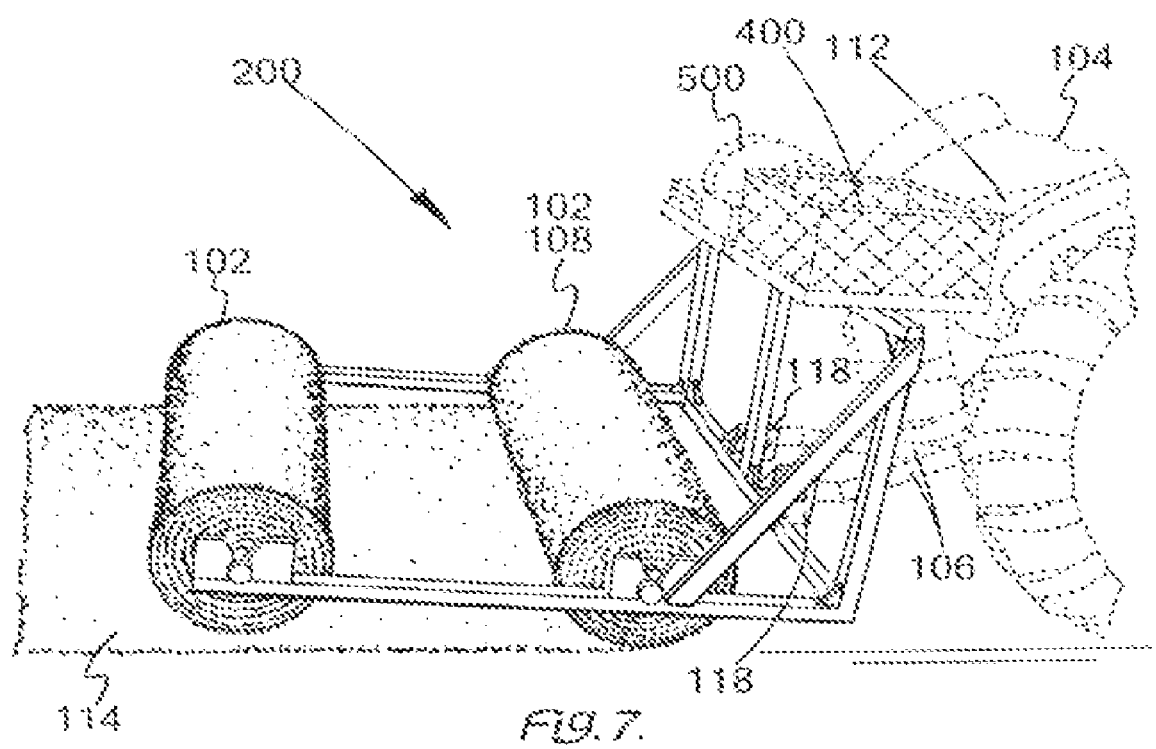
FIG. 7 depicts a perspective view of dual-roll landscape layer 200 of this invention in use.
Figure 8:
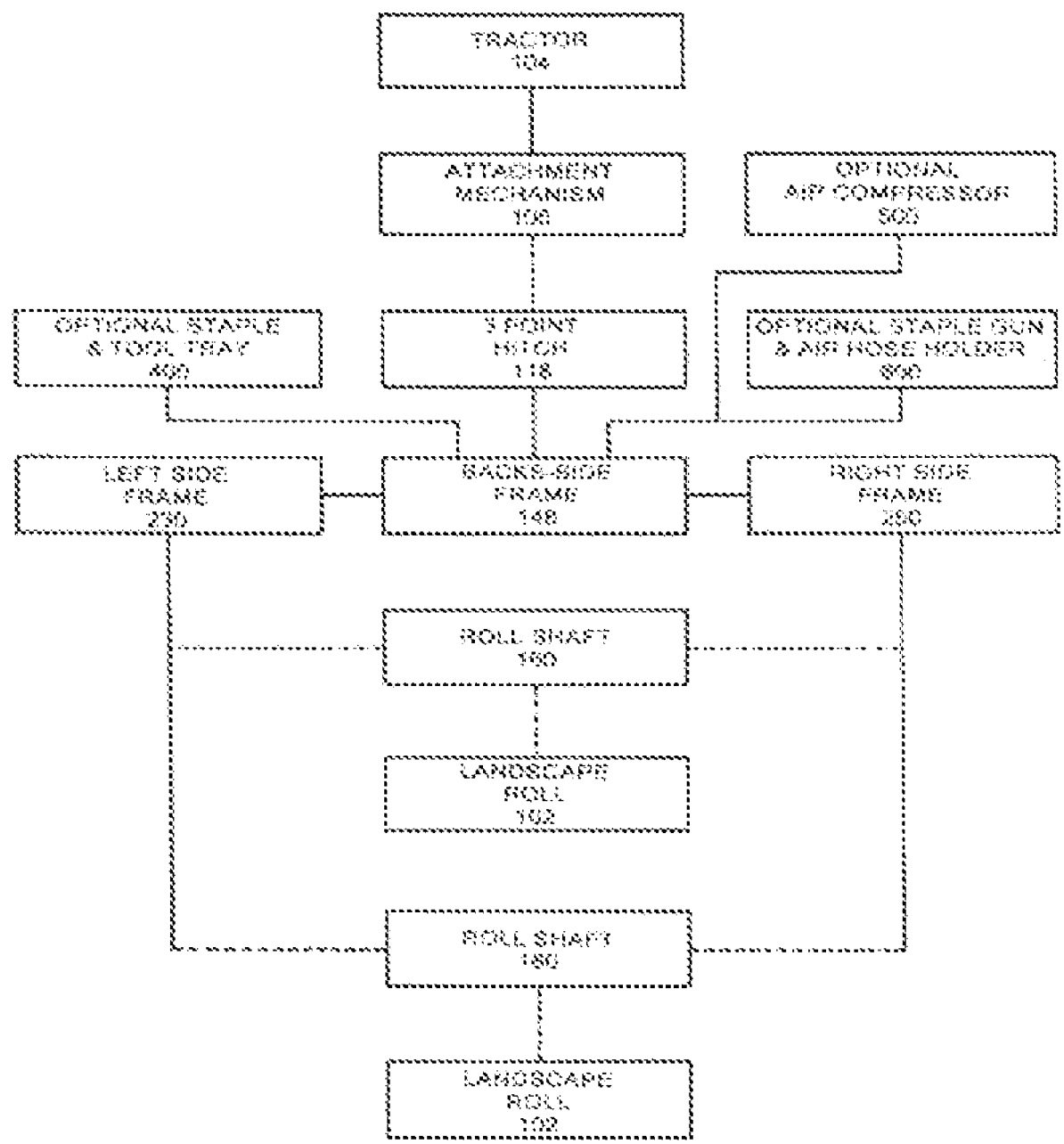
FIG. 8 depicts a block diagram of dual-roll landscape layer 200, based on FIG. 7.
Figure 9:
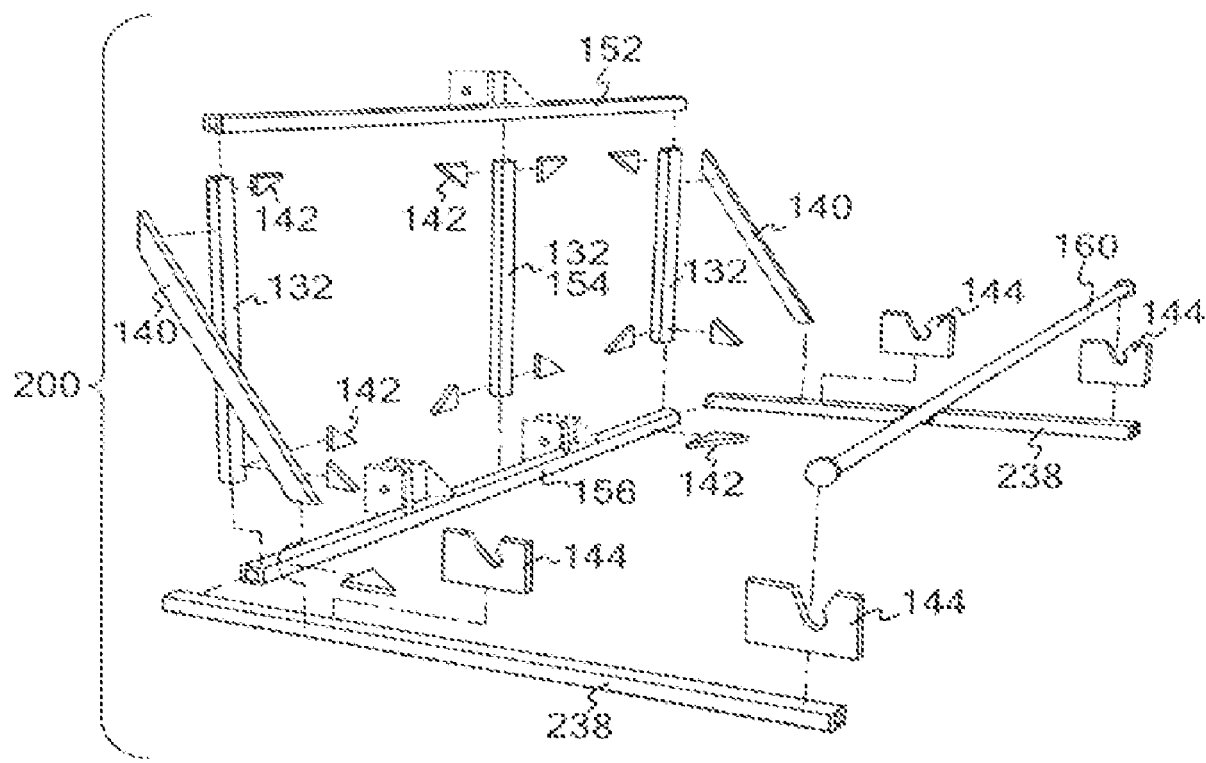
FIG. 9 depicts an exploded perspective view of dual-roll landscape layer 200.
Figure 10:
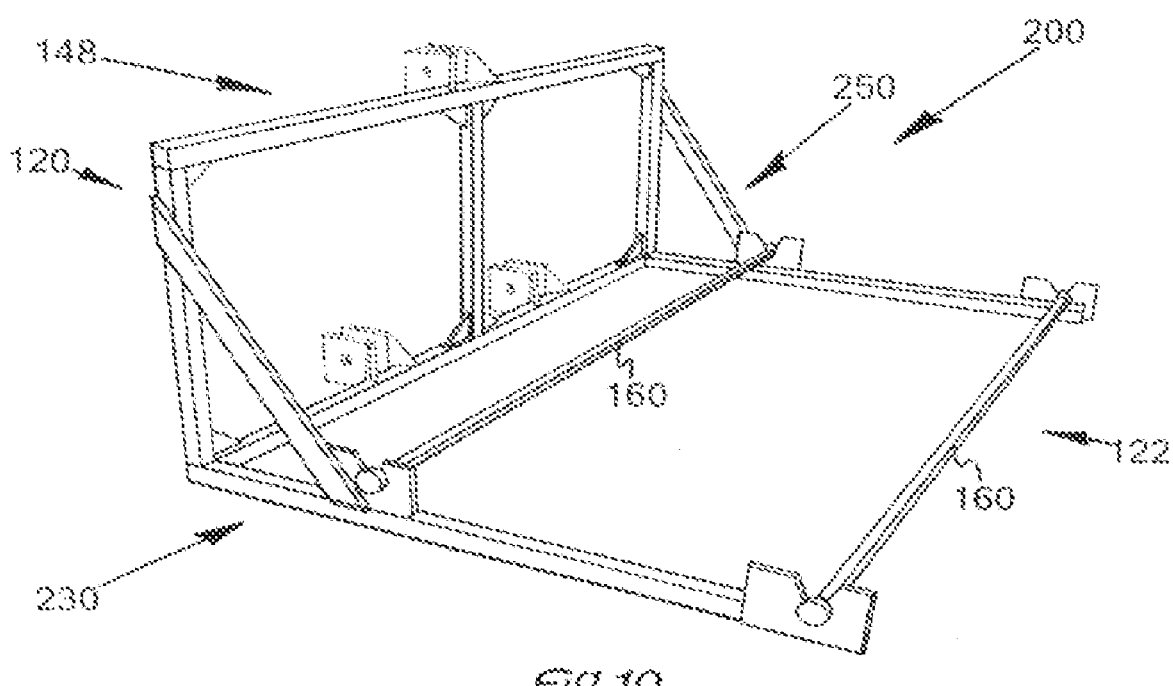
FIG. 10 depicts a perspective view of a dual-roll landscape layer 200 of this invention, based on a reverse view of FIG. 7.
Figure 11:
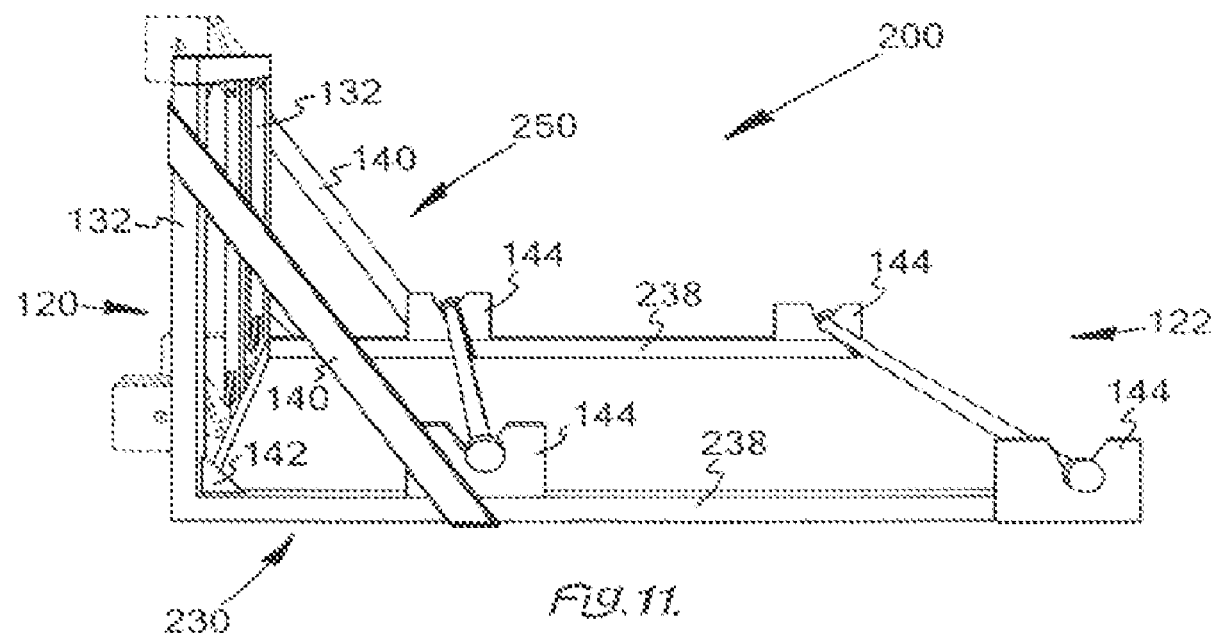
FIG. 11 depicts a side view of dual-roll landscape layer 200.
Figure 12:
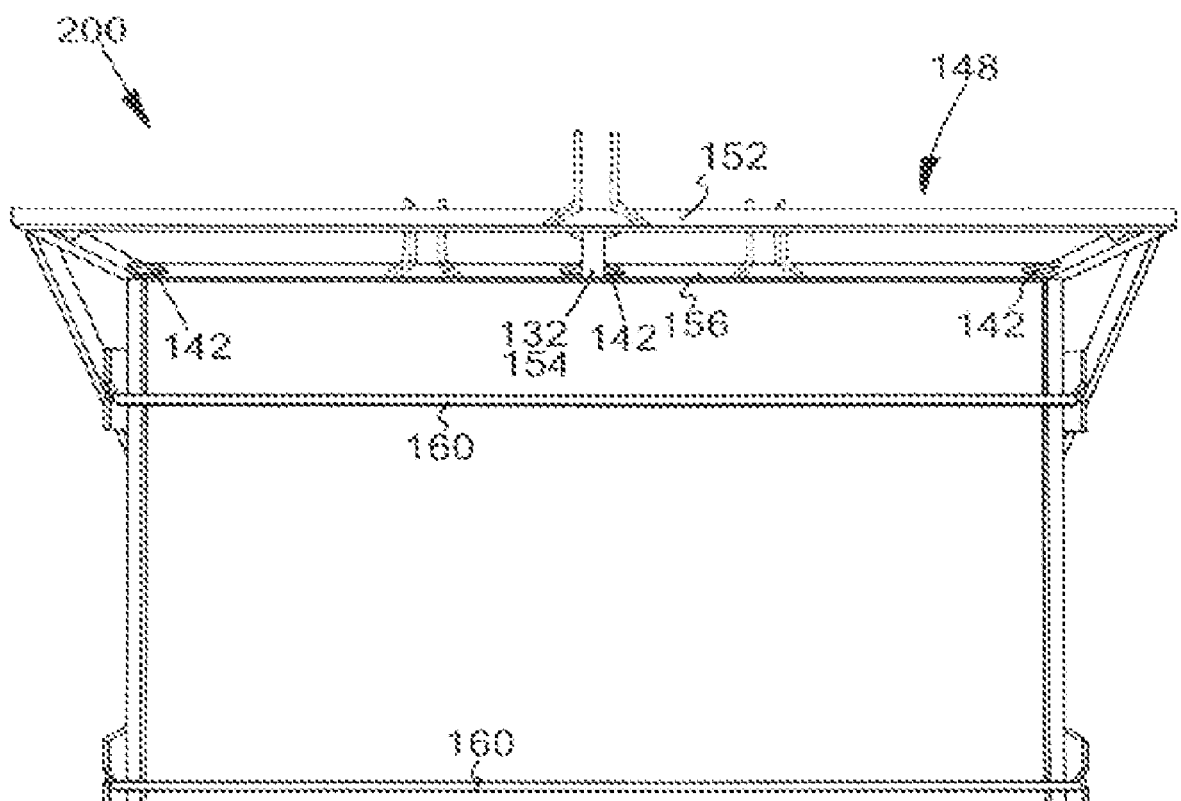
FIG. 12 depicts a top plan view of dual-roll landscape layer 200.

Each back standing channel 132 is supported on each dual-roll bottom leg channel 238 with a standing angle brace 140. In a preferred form, a single first roll bracket 144 is mounted to both standing angle brace 140 and dual-roll bottom leg channel 238, thereby forming an extremely strong joint on each of dual-roll right side frame 250 and dual-roll left side frame 230. In FIG. 7, first roll bracket is in active position 108 and is being applied to the ground.

A second roll bracket 144 is mounted at or near the end of dual-roll bottom leg channel 238, which is the material delivery side 122. Material delivery side 122 is opposite of each back standing channel 132. Roll bracket 144 operates in pairs to receive roll shaft 160 and support landscape roll 102 for spreading. The end roll bracket 144 permits spreading of the positioned landscape material 114, which is on roll bracket 144 closest to tractor 104, with height adjustment cylinder 112.

Dual-roll landscape layer 200 has optional accessories. Dual-roll landscape layer has as an option optional staple and tool tray 400, optional air compressor 500, and optional staple gun with air hose and holder 600. These optional accessories may be attached to top joining cross channel 152 by any suitable attachment mechanism.

Referring now to FIG. 13, FIG. 14, FIG. 15, FIG. 16, FIG. 17 and FIG. 18, and those figures related thereto are modified to receive more than two of landscape roll 102 and form multi-roll landscape layer 300. The structure greatly simplifies the supply of the landscape rolls 102 at the job site.

Multi-roll landscape layer 300 attaches to tractor 104 through attachment mechanism 106. Attachment mechanism 106 can be any suitable mechanism such as a standard three point hitch 118. A height adjustment cylinder 112 moves the single landscape roll 102 along with the single landscape roll layer 100 to a desired position.

Multi-roll landscape layer 300 has a multi-roll left side frame 330 with a multi-roll bottom leg channel 338 extending therefrom. Multi-roll left side frame 330 is formed in standard fashion by back standing channel 132 and multi-roll standing angle brace 340. Multi-roll bottom leg channel 338 is substantially longer than single roll bottom leg channel 138, which forms a left extension and a right extension. This extra length permits multi-roll bottom leg channel 338 to support multiple roll brackets 144.

Multi-roll right side frame 350 is similar in structure to multi-roll left side frame 330. As in single landscape roll layer 100, multi-roll right side frame 350 is connected to multi-roll left side frame 330 by back standing channel 132 cooperating with top joining cross channel 152 and bottom joining cross channel 156. The upper frame includes top joining cross channel 152.

Moreover, multi-roll back-side frame 348 has further modifications. Multi-roll back-side frame 348 has five back standing channels 132. Multi-roll back-side frame 348 has two back standing channels 132 at the edges and the center standing channel 154 on the middle of bottom joining cross channel 156. In addition, multi-roll back-side frame 348 has a reinforcement standing channel 352 in between each back standing channel 132 and center standing channel 154. These channels are reinforced by corner strengthening braces 142. These five channels adjacent to tractor 104 make multi-roll landscape layer 300 very strong.

Figure 13:
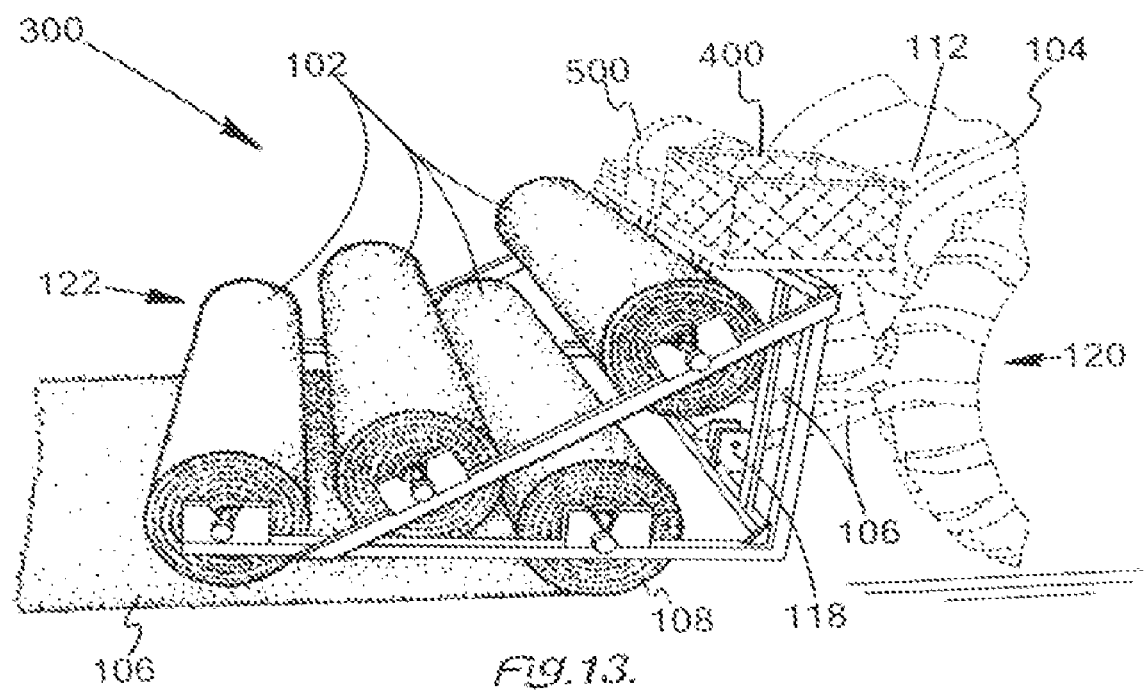
FIG. 13 depicts a perspective view of multi-roll landscape layer 300 of this invention in use.
Figure 14:
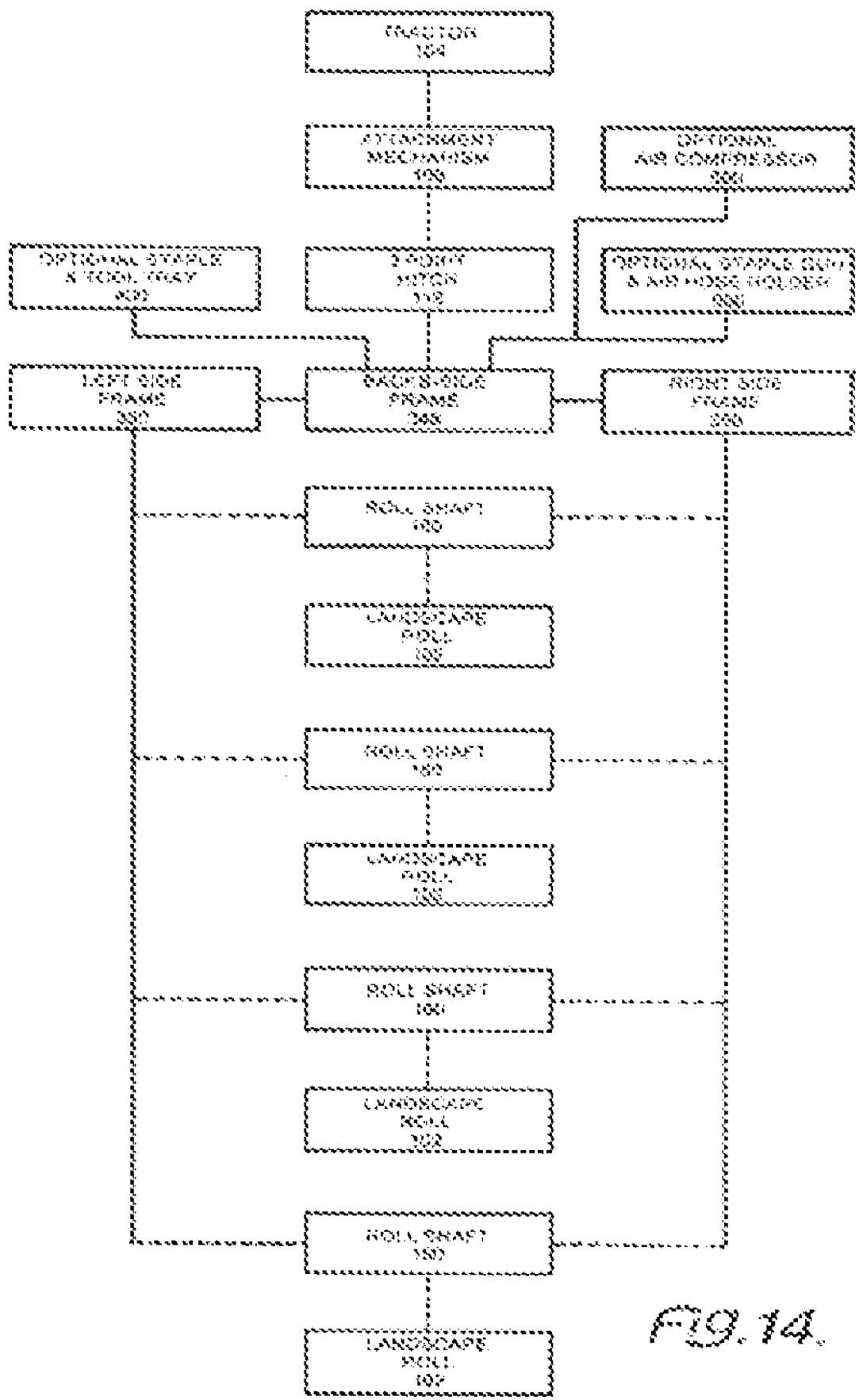
FIG. 14 depicts a block diagram of multi-roll landscape layer 300 of this invention, based on FIG. 13.
Figure 15:
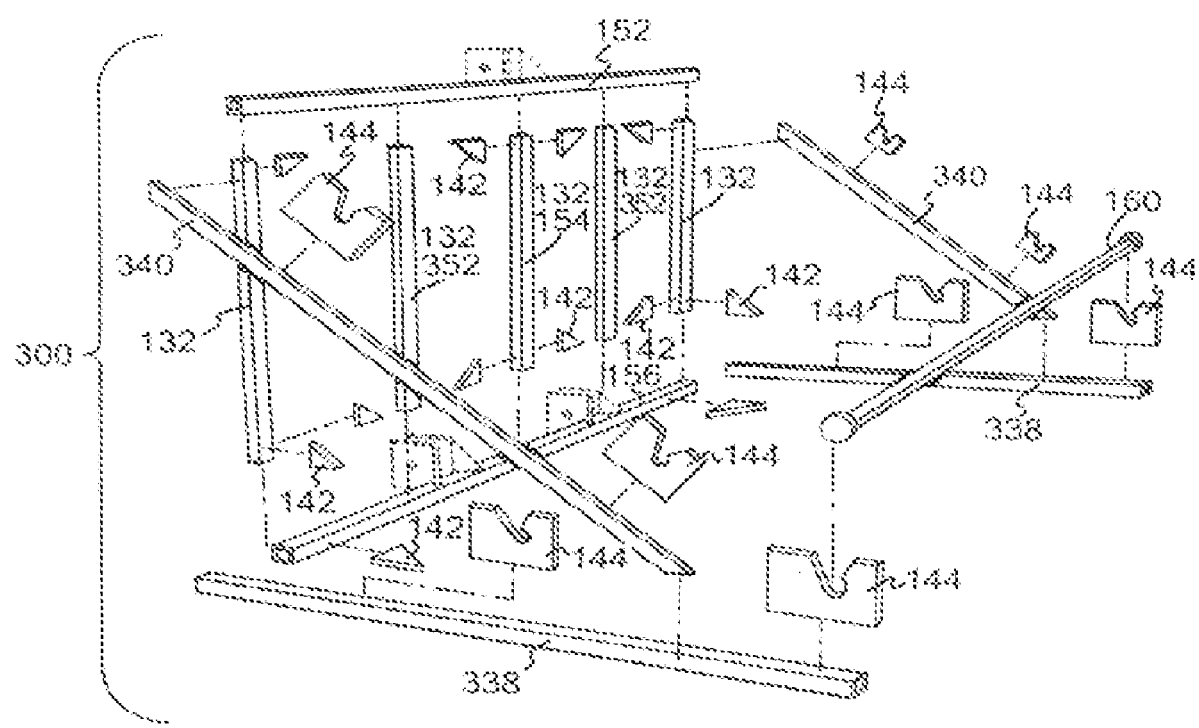
FIG. 15 depicts an exploded perspective view of multi-roll landscape layer 300 of this invention, based on FIG. 13.
Figure 16:
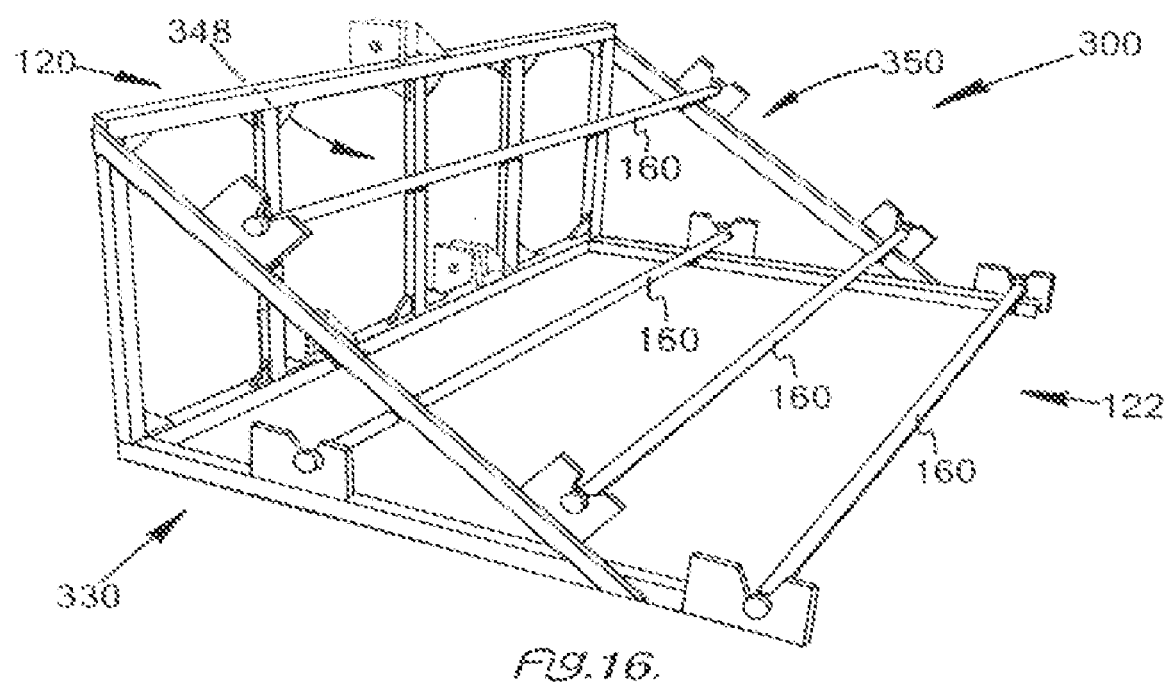
FIG. 16 depicts a perspective view of a multi-roll landscape layer 300 of this invention, based on a reverse view of FIG. 13.
Figure 17:
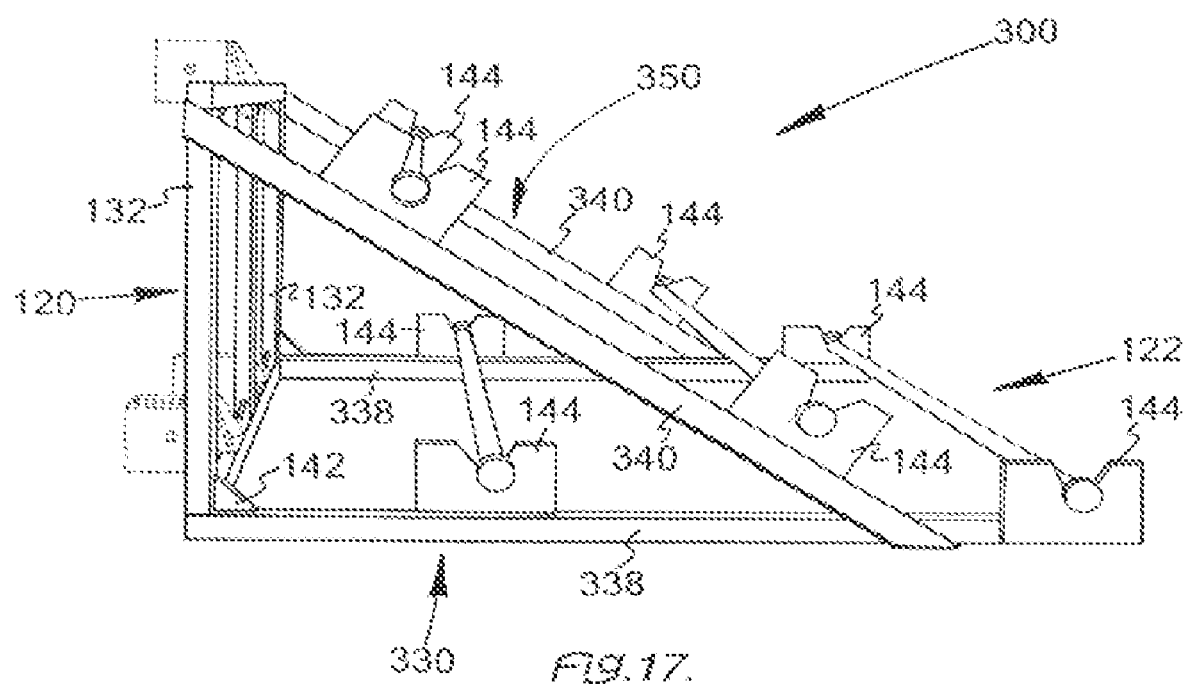
FIG. 17 depicts a side view of multi-roll landscape layer 300 of this invention.
Figure 18:
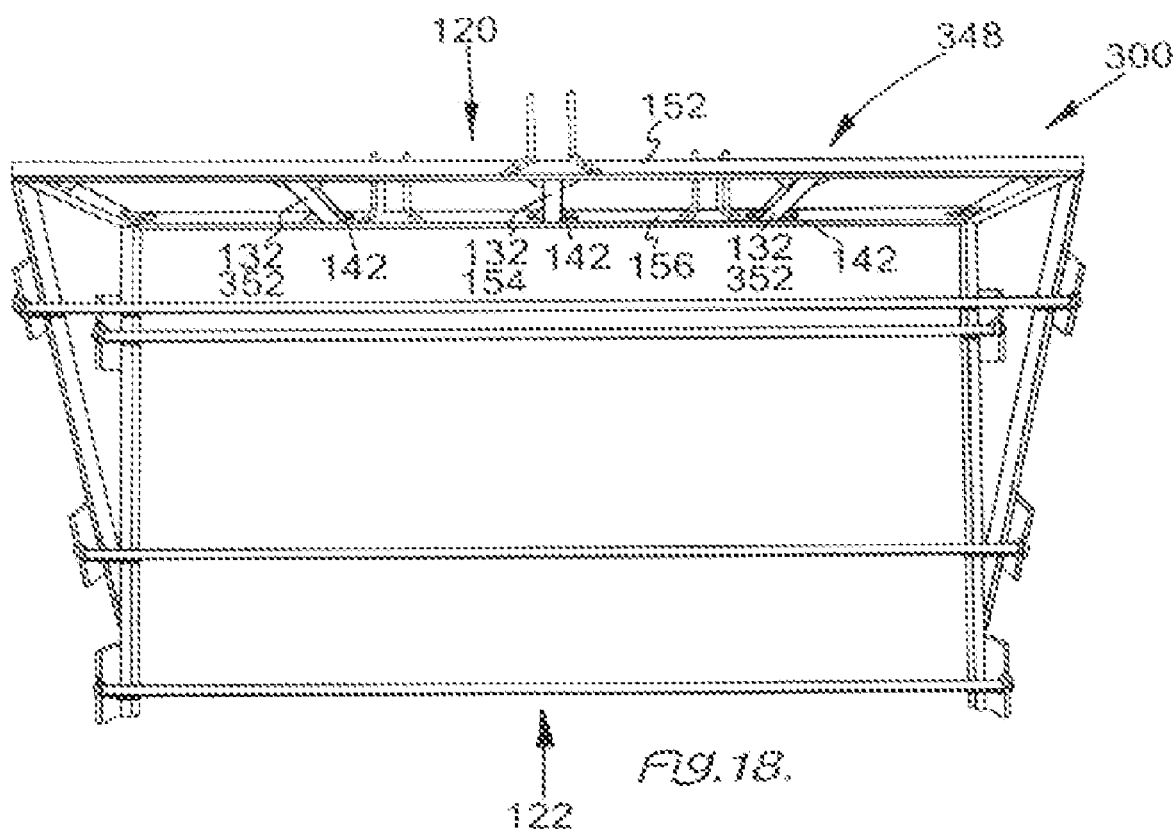
FIG. 18 depicts a top plan view of multi-roll landscape layer 300 of this invention.

Multi-roll standing angle brace 340 replaces standing angle brace 140, and has secured thereto the roll brackets 144, which form the additional roll mounts. Landscape roll shaft 160, which carries landscape roll 102 is positioned in roll bracket 144. In this fashion, multi-roll standing angle brace 340 permits the forming of multi-roll landscape layer 300. As seen in FIG. 13, first landscape roll 102 is in active position 108.

Multi-roll landscape layer 300 may have a number of optional attachments. These attachments include an optional staple and tool tray 400 (FIG. 21), an optional air compressor 500 (FIG. 22), and an optional staple gun and air hose holder 600 (FIG. 23).

Figure 19:
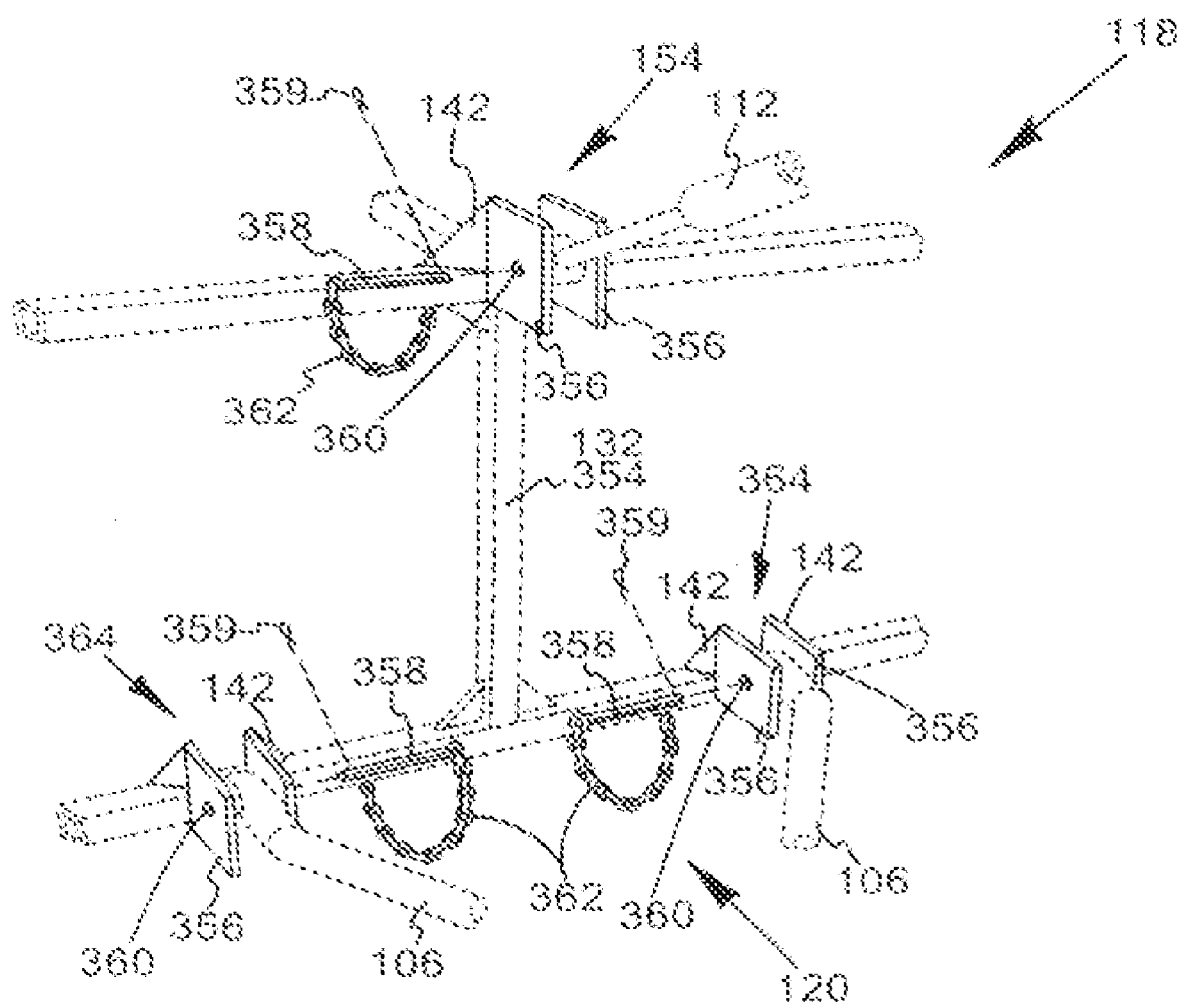
FIG. 19 depicts a standard three-point hitch 118 suitable for use with FIG. 1, FIG. 7 or FIG. 13.

With the addition of FIG. 19, the structure of the standard three-point hitch 118 becomes clear. Single landscape roll layer 100 (FIG. 1), dual-roll landscape 200 (FIG. 7), and multi-roll landscape layer 300 (FIG. 13) attaches to tractor 104 through attachment mechanism 106. Attachment mechanism 106 can be any suitable mechanism such as a standard three point hitch 118. A height adjustment cylinder 112 moves the single landscape roll 102 along with the single landscape roll layer 100 to a desired position.

The top hitch 354 is positioned on top joining cross channel 152 at center standing channel 154. Bottom hitches 364 are positioned on bottom joining cross channel 156 on each side of back standing channel 132 or center standing channel 154. The connection between three point hitch 118 single landscape roll layer 100, dual-roll layer 200, and multi-roll landscape layer 300 is strengthened through corner strengthening braces 142.

Top hitch 354 and bottom hitches 364 each have a pair of hitch plates 356, which receive the standard attachment mechanism 106 of the standard three-point hitch 118. Each hitch plate 356 has a plate aperture 360 bored through it.

Attached to bottom joining cross channel 156 is pin tether 362. Pin tether 362 is attached to hitch pin 358 and secures the attachment of hitch pin 358 to bottom joining cross channel 156. Hitch pin 358 is inserted through plate aperture 360 and into standard attachment mechanism 106 to form a secure and stable connection with tractor 104.

Securing mechanism 378 is inserted through pin aperture 368 to perpendicularly secure the attachment between hitch pin 358 and standard attachment mechanism 106. Securing mechanism 378 can be any suitable attachment mechanism including a standard clevis pin, a standard lynch pin, or a standard cotter pin.

Figure 20:
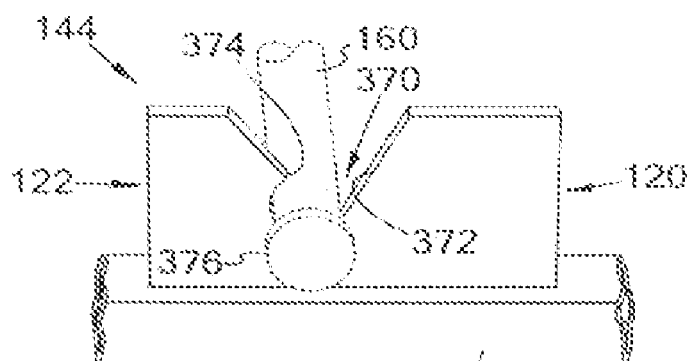
FIG. 20 depicts a roll bracket 144 suitable for use with FIG. 1, FIG. 7 or FIG. 13.

Adding FIG. 20 to the consideration, roll bracket 144 receives roll shaft 160. In single landscape roll layer 100 (FIG. 1), roll bracket 144 is attached to bottom leg channel 138. In dual-roll landscape layer 200 (FIG. 7), roll bracket 144 is attached to dual-roll bottom leg channel 238. In multi-roll landscape layer 300 (FIG. 13), roll bracket 144 is attached to multi-roll bottom leg channel 338. Within roll bracket 144 is a roll bracket slot 370. Roll bracket slot 370 includes a slot entry or removal side 372, with a slot captive side 374 oppositely disposed. Adjacent the slot captive side 374 is material delivery side 122, while slot entry or removal side 372 is adjacent to tractor side 120. Roll shaft 160 has roll shaft hub 376 on each of its outer edges. Roll shaft hub 376 horizontally secures roll shaft 160 inside of roll bracket slot 370.

Figure 21:
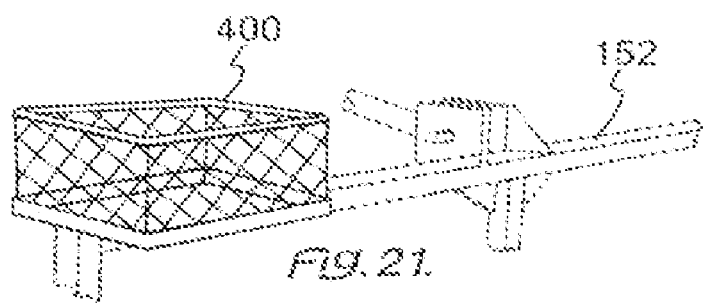
FIG. 21 depicts a staple and tool tray 400 suitable for use with FIG. 1, FIG. 7 or FIG. 13.
Figure 22:
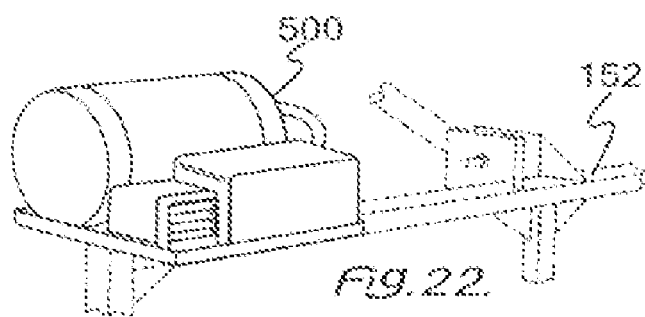
FIG. 22 depicts an air compressor 500 suitable for use with FIG. 1, FIG. 7 or FIG. 13.

Adding FIG. 21 to the consideration, the staple and tool tray 400 optionally secured to top joining cross channel 152 is depicted. Adding FIG. 22 to the consideration, air compressor 500 secured to top joining cross channel 152 is depicted. Adding FIG. 23 to the consideration, staple gun with an air hose and holder 600 secured to top joining cross channel 152 is depicted. These items may be used jointly or severally and permit securing the landscape roll 102 in the desired position.

Adding FIG. 24 to the consideration, dual-roll landscape layer 200 has multiple staple gun bank 700 mounted thereon. Back side frame 148 uses a standing angle channel 202 within side thereof. This reinforcement accommodates weight and stress produced by the multiple staple gun bank 700. Multiple staple gun bank 700 is attached to dual-roll detachable cross member 206 which has detaching tongue 208. Bottom leg extended channel 204 has a receiving end 220, which accepts detaching tongue 208 of dual-roll detachable cross member 206.

Multiple staple gun bank 700 is powered by a detachable supply hose 218, which is coupled to the detachable air hose 216. Both detachable supply hose 218 and detachable air hose 216 are housed inside bottom leg extended channel 204. Multiple staple gun bank 700 is secured to each bottom leg extended channel 204 with a locking pin 212 passing through channel aperture 214 in channel 204 and tongue aperture 210 in tongue 208. As channel aperture 214 is aligned with tongue aperture 210, locking pin 212 passes through both apertures and releasably secures multiple staple gun bank 700 in the desired position.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A landscape roll layer for spreading at least one roll of material useful in landscaping with a tractor comprising:
   the landscape roll layer having a right side frame, a left side frame, an upper frame, and a lower frame;
   the right side frame being oppositely disposed tram the left side frame;
   the right side frame and the left side frame connecting the upper frame to the lower frame;

the landscape roll layer including a holding means to support the at least one roll of material;
the at least one roll of material being spreadable;
the right side frame, the left side frame, the upper frame and the lower frame cooperating to form a back side frame for the landscape roll layer and a material delivery side for the landscape roll layer;
the back side frame being positionable adjacent to a tractor for the landscape roll layer;
the material delivery side being oppositely disposed front the back side frame;
the right side frame having a back standing channel, a front standing channel, a top cross channel and a bottom leg channel;
the back standing channel, the front standing channel, the top cross channel and the bottom leg channel forming a parallelogram;
the back standing channel being oppositely disposed from the front standing channel;
the top cross channel being oppositely disposed from the bottom leg channel;
the bottom leg channel including a right extension beyond and below the parallelogram;
the left side frame being similar in structure;
the left side frame including a left extension similar to the right extension;
a first roll bracket being mounted on the right extension;
a second roll bracket being mounted on the left extension;
the first roll bracket and the second roll bracket cooperating to receive and support a roll shaft;
the roll shaft being adapted to carry a landscape roll positioned in the first roll bracket and the second roll bracket;
the right bottom leg channel having the right extension;
the left bottom leg channel having the left extension;
a first standing angle brace connecting the right extension and the front standing channel; and
a second standing angle brace connecting the left extension to a second front standing channel in fashion similar to the first standing angle brace.

2. The landscape roll layer of claim 1 further comprising:
a) the landscape roll layer having at least one right angle corner;
b) a corner brace being secured in the right angle corner; and
c) the roll bracket being secured to the standing angle brace or the bottom leg channel.

3. The landscape roll layer of claim 2 further comprising:
a) the right side frame being connected to the left side frame with a top joining cross channel connected to the back standing channel;
b) a center standing channel being positioned and connected between the right side frame and the left side frame; and
c) a bottom joining cross channel being positioned and connected between the right side franc and the left side frame.

4. The landscape roll layer of claim 3 further comprising:
a) the center standing channel connecting between the top joining cross channel and the bottom joining cross channel;
b) a front joining cross channel being oppositely disposed from top joining cross channel;
c) a front joining cross channel connecting a top of the left side frame and the right side frame; and
d) a top linear support channel being positioned between the top cross channel and the front joining cross channel.

5. The landscape roll layer of claim 4 further comprising:
a) a three-point hitch having a first bottom hitch and a second bottom hitch secured to bottom joining cross channel;
b) the first bottom hitch and the second bottom hitch being on opposing sides of center standing channel;
c) a top hitch secured to the top joining cross channel at the center standing channel; and
d) the landscape roll layer having at least one accessory selected from the group consisting of a staple tray, a tool tray, an air compressor; a staple gun; an air hose and a hose holder.

6. A landscape roll layer for spreading a roll of material and carrying at least two rolls of material useful in landscaping with a tractor comprising:
the landscape roll layer having a right side frame, a left side frame, an upper frame, and a lower frame;
the right side frame being oppositely disposed from the left side frame;
the right side frame and the left side frame connecting the upper frame to the lower frame;
the landscape roll layer including at least a first holding means and a second holding means to support at least one of the roll of material in each of the first holding means and the second holding means;
the at least one roll of material being spreadable from the landscape roll layer;
the right side frame, the left side frame, the upper frame and the lower frame cooperating to form a back side frame for the landscape roll layer and a material delivery side for the landscape roll layer;
the back side frame being positionable adjacent to a tractor for the landscape roll layer;
the material delivery side being oppositely disposed from the back side frame;
the right side frame having a back standing channel, a standing angle brace, and a bottom leg channel;
the back standing channel, the standing angle brace, and the bottom leg channel forming a triangle;
the bottom leg channel being perpendicular to the back standing channel and the bottom leg channel connecting to the bottom of the back standing channel;
the standing angle brace supporting the connection between the back standing channel and the bottom leg channel;
the bottom leg channel including a right extension beyond and below the triangle;
the left side frame being similar in structure;
the left side frame including a left extension similar to the right extension;
a first roll bracket being mounted on the right extension;
a second roll bracket being mounted on the left extension;
the first roll bracket and the second roll bracket cooperating to receive and support a roll shaft and form a first roll mount;
a second roll mount similar to the first roll mount being included;
the right bottom leg channel having the right extension;
the left bottom leg channel having a left extension;
a right standing angle brace connecting the right extension and the bottom leg channel;
the landscape roll on the second roll mount being spreadable before the landscape roll on the first roll mount; and
a second standing angle brace connecting the left extension to a second bottom leg channel in fashion similar to the first standing angle brace.

7. The landscape roll layer of claim 6 further comprising:
a) the landscape roll layer having at least one right angle corner;
b) a corner brace being secured in the right angle corner; and
c) the roll bracket being secured to the standing angle brace or the bottom lag channel.

8. The landscape roll layer of claim 7 further comprising:
a) the right side frame being connected to the left side frame with a top joining cross channel connected to the back standing channel;
b) a center standing channel being positioned and connected between the right side frame and the left side frame; and
c) a bottom joining cross channel being positioned and connected between the right side frame and the left side frame.

9. The landscape roll layer of claim 8 further comprising:
a) the center standing channel connecting between the top joining cross channel and the bottom joining cross channel.

10. The landscape roll layer of claim 9 further comprising:
a) a three-point hitch having a first bottom hitch and a second bottom hitch secured to bottom joining cross channel;
b) the first bottom hitch and the second bottom hitch being on opposing sides of center standing channel;
c) a top hitch secured to top joining cross channel at the center standing channel; and
d) the landscape roll layer having at least one accessory selected from the group consisting of a staple tray, a tool tray, an air compressor; a staple gun; an air hose and a hose holder.

11. The landscape roll layer of claim 10 further comprising:
a) at least a third roll mount used in cooperation with the second roll mount and the first roll mount;
b) the at least a third roll mount being attached to the standing angle brace;
c) the back side frame having at least one additional reinforcement standing channel between each back standing channel and center standing channel;
d) the at least one accessory securing a positioned landscape material in a desired position; and
e) the positioned landscape material being dispensed from the first roll mount, the second roll mount and the third roll mount.

* * * * *